(12) United States Patent
Roe

(10) Patent No.: US 6,272,757 B1
(45) Date of Patent: Aug. 14, 2001

(54) ADJUSTABLE GUIDE SHOE FOR RECIPROCATING SAW

(75) Inventor: Vance C. Roe, Lindenhurst, IL (US)

(73) Assignee: S-B Power Tool Company, Broadview, IL (US)

( * ) Notice: Subject to any disclaimer, the term of this patent is extended or adjusted under 35 U.S.C. 154(b) by 0 days.

(21) Appl. No.: 09/358,781

(22) Filed: Jul. 22, 1999

(51) Int. Cl.[7] .................................................. B23D 49/14
(52) U.S. Cl. ............................................... 30/377; 30/392
(58) Field of Search ...................... 30/374, 377, 392–394

(56) References Cited

U.S. PATENT DOCUMENTS

| | | | |
|---|---|---|---|
| 3,360,021 | 12/1967 | Mejia ...................................... | 143/68 |
| 4,113,221 | 9/1978 | Wehner ................................... | 248/408 |
| 4,619,170 | 10/1986 | Maier et al. ............................ | 83/745 |
| 4,913,204 | 4/1990 | Moores et al. ...................... | 144/136 C |
| 5,007,172 | 4/1991 | Palm ...................................... | 30/377 |
| 5,016,354 | 5/1991 | Baine ...................................... | 30/371 |
| 5,090,461 | 2/1992 | Gakhar et al. ...................... | 144/136 C |
| 5,421,091 | 6/1995 | Gerritsen, Jr. ......................... | 30/377 |
| 5,593,244 | 1/1997 | Ruckert ................................. | 403/322 |

FOREIGN PATENT DOCUMENTS 35 20 309 A1   12/1986   (DE) .
43 27 381 A1    2/1995   (DE) .
24 35 845 A1    2/1975   (NL) .

*Primary Examiner*—Douglas D. Watts
(74) *Attorney, Agent, or Firm*—Gardner Carton & Douglas

(57) ABSTRACT

A tool-less guide shoe that includes a post is received in a hole formed in the nose section of a power saw. The post includes laterally extending locking slots and a longitudinal extending positioning slot. At the upper end of the post, a stop plate is formed at the end of the positioning slot and adjacent to a removal slot. A locking plate is used to secure the guide shoe in a position by fitting in the locking slot. The guide shoe is removed from the saw by placing the locking plate adjacent the stop plate and rotating the post approximately 90° into the removal slot.

19 Claims, 4 Drawing Sheets

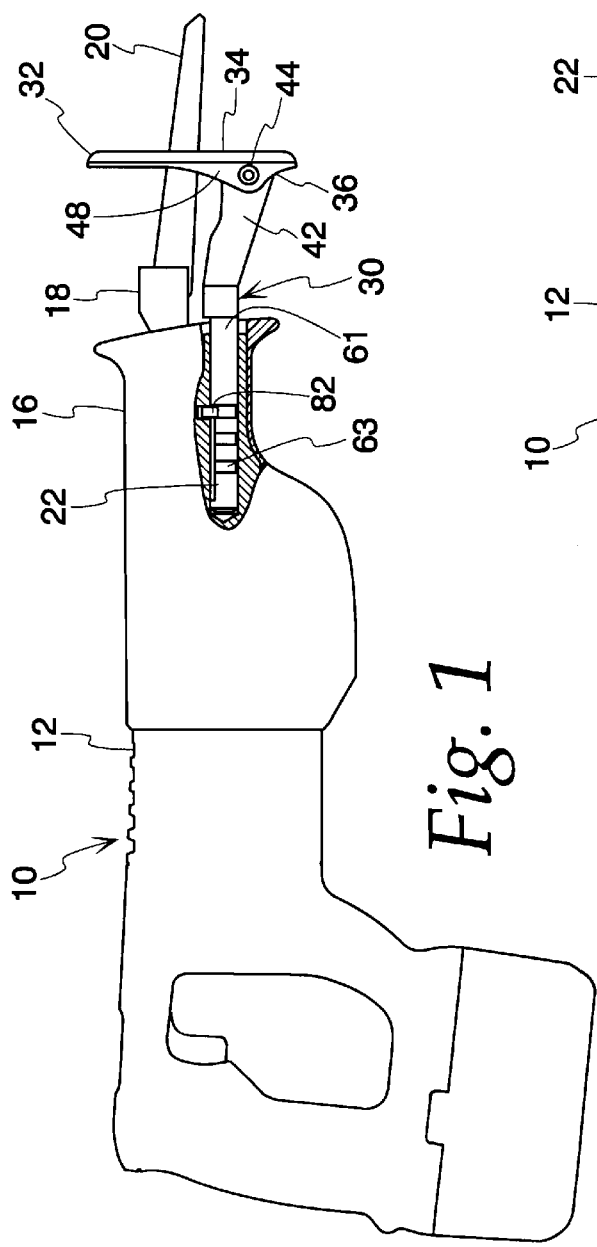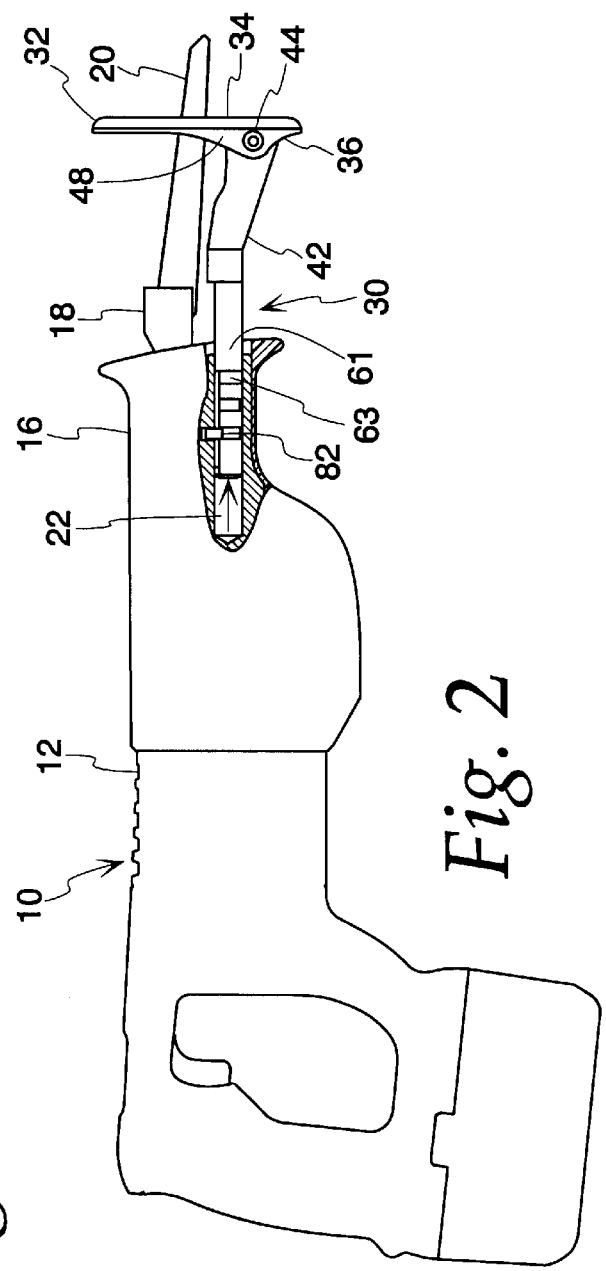

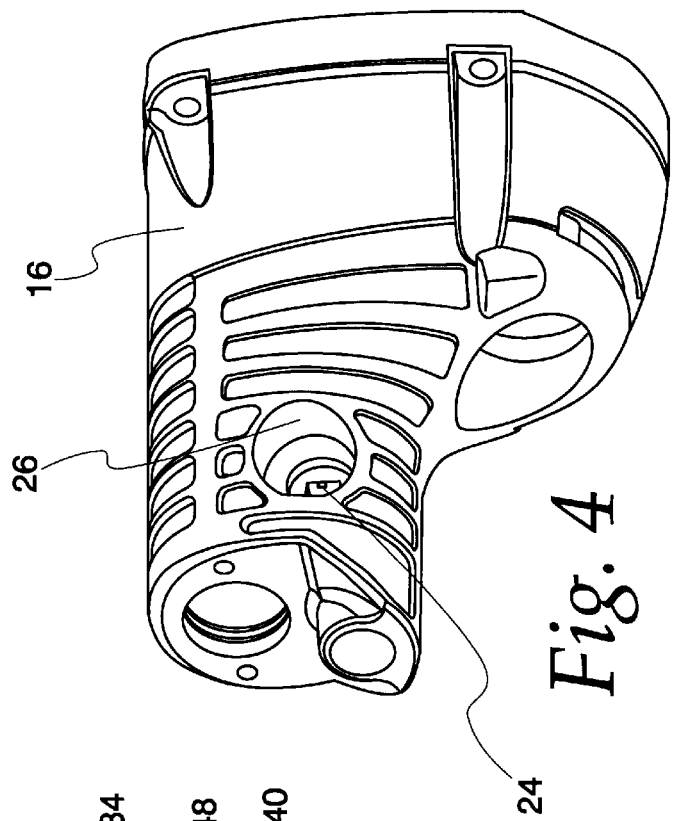
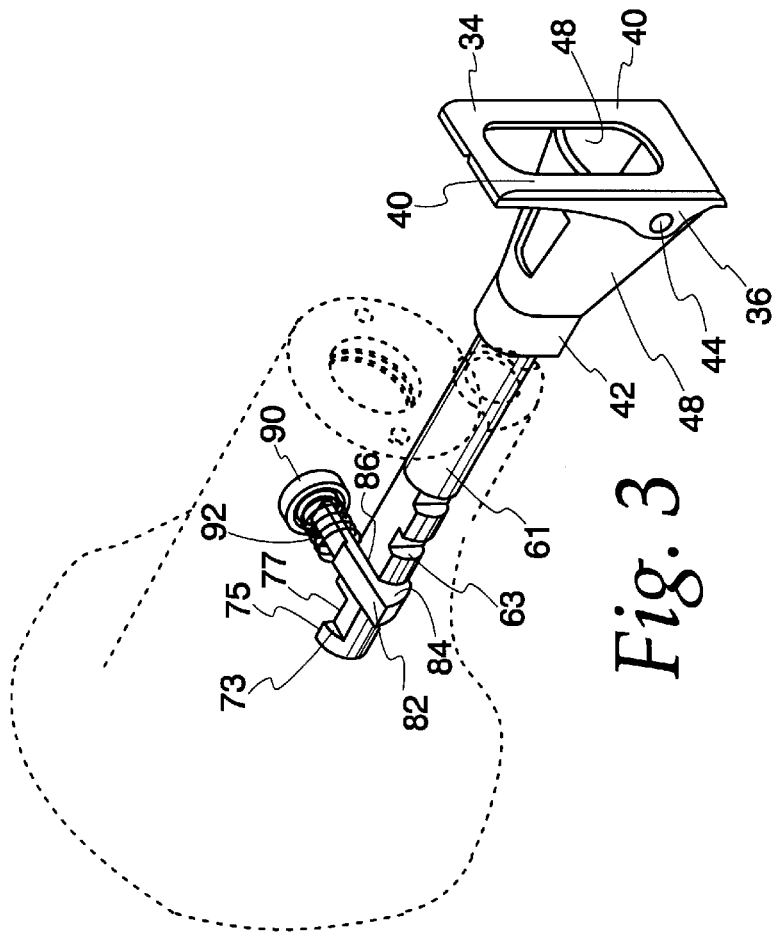

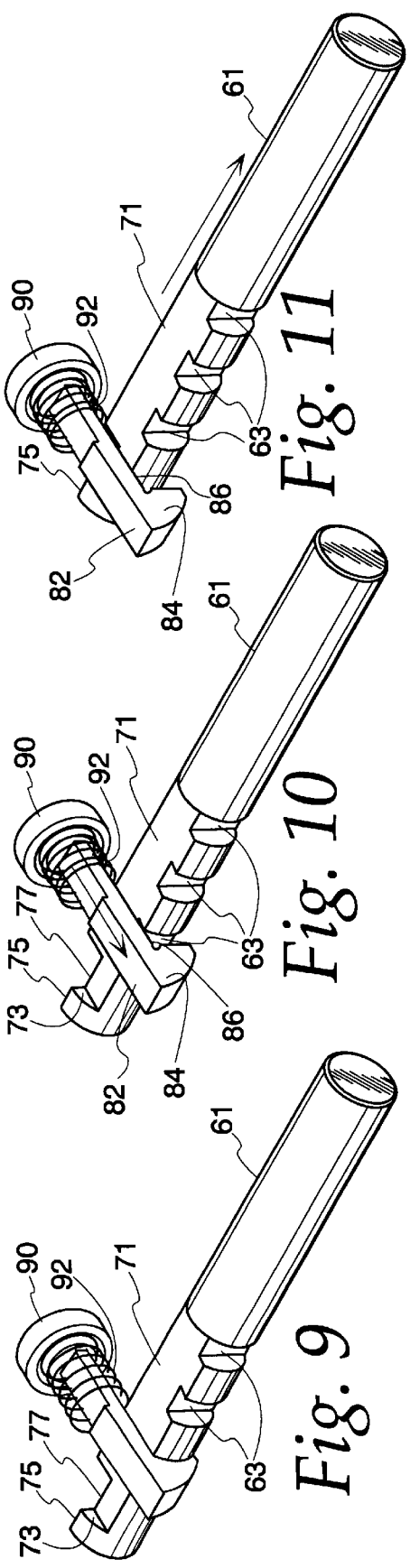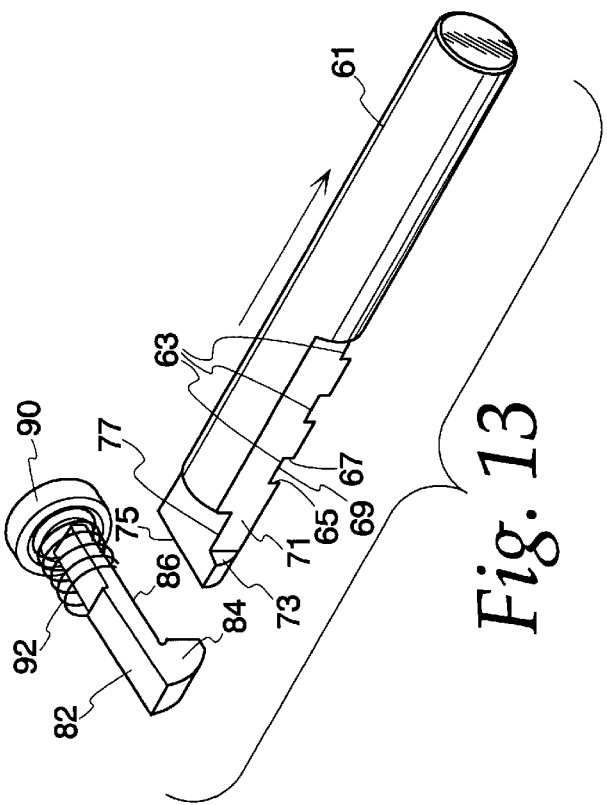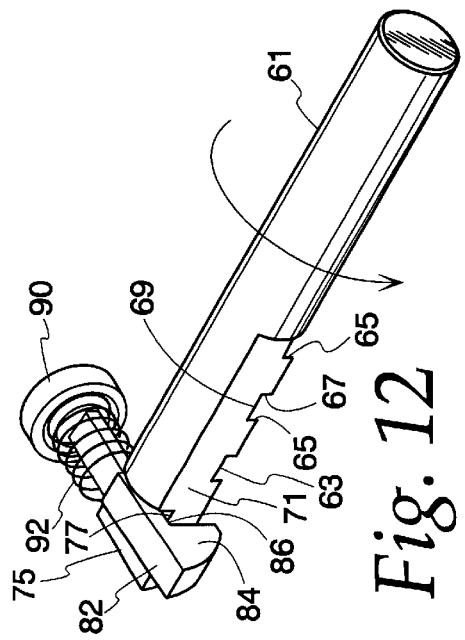

ADJUSTABLE GUIDE SHOE FOR RECIPROCATING SAW

BACKGROUND OF THE INVENTION

1. Field of the Invention

The present invention relates to a power tool having a reciprocating, and sometimes oscillating and sometime adjustable stroke length, saw blade holder. More particularly, the present invention relates to an adjustable and removable guide shoe for such a power tool.

2. Scope of the Prior Art

Reciprocating saws are provided with a shoe which permits the operator to position the saw relative the work being cut. As is known to those who are experienced in using such tools, for a particular application there is an optimum position for the shoe. Adjustment of the shoe makes plunge and pocket cuts easier and extends the blade life by cutting with different areas of the blade. Sometimes, it is also desired to remove the shoe for use of the saw in awkward positions such as corners and the like.

A typical shoe support is secured into position with adjusting screws. These screws pass through slots in the shoe support and thread into the front end of the gear housing clamping the support and shoe in the desired position. Adjustment of the shoe position requires the use of a separate tool, such as a screwdriver. This adjustment procedure is often not performed by the operator because the procedure consumes appreciable time and is cumbersome. Moreover, the separate tool necessary to loosen or tighten the screws is, more often than not, lost or misplaced. Consequently, optimum positioning of the shoe for a given application may often not be achieved.

Another form of guide shoe adjustment mechanism is shown in U.S. Pat. No. 5,007,172 to Palm. According to that patent, adjustment is accomplished by rotating a lever. Attached to this lever is a lock pin which is pivotally mounted in the front end of the gear housing transverse to the shoe support. The pin's geometry comprises a "D" shaped formation having the rounded portion thereof adapted for engagement in a selected one of three arcuate grooves formed in the support to secure the support, and hence the shoe, into the desired position. To release and reposition the shoe, the lever is rotated allowing the flat portion of the pin to be parallel with the flat portion of the support thereby providing clearance which permits the support and shoe to move freely. When the shoe has been moved to its desired position, the lever is rotated back enabling the rounded portion of the pin to engage and be received in the selected arcuate groove in the support thereby to establish the new position for the shoe.

U.S. Pat. No. 5,421,091 to Gerritsen, Jr. discloses another tool-less-type guide shoe. The mechanism described in that patent includes a bracket, to which the foot is pivotally connected, that includes a plurality of slots and a button that engages in the slots to secure the shoe in a selected position. The button extends through the housing in the saw and is spring biased into the slots. The user depresses the button and moves the bracket to a selected position. The button is released and is returned to a locked position within the slot.

The guide shoes of the prior art, including those that require tools and those that do not, can be removed from the housing of the saw. Typically, the shoe is removed by pulling the foot and the bracket or support comes straight out of the housing. This arrangement can make it awkward to insert the guide shoe into the housing if the guide shoe is inadvertently removed. In addition, the guide shoe can be removed when the blade is attached to the blade holder.

SUMMARY OF THE INVENTION

The present invention provides a tool-less guide shoe mechanism for a power tool which does not require a separate tool for adjustment purposes and which incorporates a self-positioning and self-locking feature. In addition, the mechanism provides a means to restrict the removal of the guide shoe from the housing of the saw. Further, the mechanism of the present invention can be readily and inexpensively manufactured and incorporated in the housing of a power reciprocating saw.

The tool-less guide shoe for the present invention can be used as a part of a reciprocating saw, or an oscillating saw. The saw includes a housing having a nose section. The saw blade is connected to a blade holder that projects from the nose section. The blade holder moves in a reciprocating pattern by way of a motor. The nose section includes a receiving hole that is in a parallel space relationship with the blade holder. The tool-less guide shoe of the present invention is received in the hole.

The tool-less guide shoe includes a post, a bracket welded to the lower end of the post and a foot that is pivotally mounted to the bracket by pins. Towards the upper end of the post, the post includes a plurality of laterally arranged locking slots. At the upper end, the post includes a stop plate and a removal slot that is rotationally adjacent the stop plate. The post also includes a positioning slot which extends between the stop plate and the locking slots.

The post of the present invention is held in position, and allowed to move relative the nose section, by a locking plate. The locking plate is generally L-shaped having a locking portion as the foot and a positioning portion as the leg. The locking plate moves through a slot in the nose section between an engaged position and an open position. In the engaged position, the locking portion is positioned within the locking slots to secure the guide shoe in a selected position relative the nose section. In the open position, the locking portion is pushed out of the locking slots and the positioning portion is placed adjacent the post such that the post can move through the positioning slot between the plurality of locking slots and the stop plate. In the open position, the guide shoe is removed by putting the locking plate in the open position and pulling the guide shoe away from the nose so that the locking plate is adjacent the stop plate. In this position, the guide shoe is rotated approximately 90° so that the locking plate is positioned in the removal slot. In order to rotate the guide shoe, the blade must be removed from the blade holder. Otherwise, the blade extends through the foot portion of the guide shoe and prevents the guide shoe from rotating.

These and numerous other features and advantages of the present invention will become readily apparent from the following description, the accompanying drawings and the appended claims.

DESCRIPTION OF THE DRAWINGS

FIG. 1 illustrates a reciprocating saw having a tool-less guide shoe made in accordance with the principles of the present invention, which is shown in breakaway;

FIG. 2 illustrates the guide shoe shown in FIG. 1 where the guide shoe is secured in another position;

FIG. 3 illustrates an isometric view of the guide shoe;

FIG. 4 illustrates the housing nose section of the reciprocating saw;

FIG. 9 shows the post and locking plate where the locking plate is secured in a locking slot and in an engaged position before removal of the guide shoe;

FIG. 10 shows the locking plate removed from the locking slot and in an open position to remove the guide shoe;

FIG. 11 shows the locking plate moved through the positioning slot to the stop plate while in the open position to remove the guide shoe;

FIG. 12 shows the post rotated through the channel into the removal slot to remove the guide shoe; and FIG. 13 shows the locking plate disengaged from the post thereby removing the guide shoe.

DETAILED DESCRIPTION OF THE PREFERRED EMBODIMENT

Figure 5:
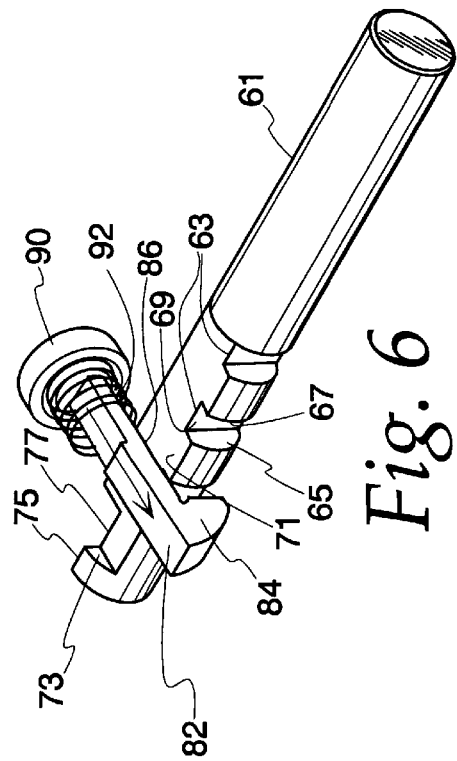
FIG. 5 shows the post and locking plate made in accordance with the principles of the present invention where the locking plate is secured in a locking slot and in an engaged position before adjusting the position of the guide shoe.

Referring to FIGS. 1 and 2, a power tool in the form of a reciprocating saw is generally designated 10. The tool 10 includes a housing 12 that, in part, forms a nose section 16. The tool suitably mounts a blade holder 18 for reciprocating movement. The blade holder mounts a saw blade 20. Of course, the power tool includes a motor (not shown), normally an electric motor, which drives a suitable gear mechanism and transmission to impart reciprocating movement to the blade holder 18. The tool may also be provided with mechanism to provide an orbital movement to the saw blade 20. The present invention is directed to the tool-less guide shoe 30 that can be adjusted between different positions relative the nose section 16 and can be removed from the nose section 16.

Referring to FIGS. 3 and 4, the nose section 16 also has a hole 22 formed parallel to the blade holder 18. The hole 22 extends from the end of the nose section towards the upper end of the nose section. At a location above the end of the nose section 16 includes a slot 24 which is transverse to and intersects with the hole 22. An indent 26 is formed on the outer surface of the housing around the space formed by the slot 24.

The adjustable tool-less guide shoe 30 is essentially of conventional construction. the guide shoe has a foot portion 32 that includes a base 34 and side flanges 36 extending perpendicularly from the base 34. In the preferred embodiment, the base 34 includes a center aperture 36 through which the blade extends. The aperture defines two elongated sides 40. In an alternative embodiment (not shown), the base 34 has a generally C-shape with two arms and an enlarged shoulder. The foot portion 32 is mounted to a bracket 42 by pins 44 for pivoting movement relative the shoe 30. In this regard, the bracket 42 is provided with a pair of identical ears 48. The ear 48 includes a hole (not shown) receiving the pin 44. It is understood, of course, that a pair of the pins 44 is provided for respective engagement with the ears 30.

The guide shoe 30 also includes an elongated post 61 that has a first upper end and a second lower end. The bracket 42 is connected to the lower end, and in the preferred embodiment the two elements are welded together.

Referring to FIGS. 5–13, the post 61 includes a plurality of locking slots 63 that are used to secure the guide shoe in a position relative the housing. Each slot 63 has opposing cam faces 65, 67 that extend to a slot base 69. The slots 63 are extended laterally through the post 61 and are positioned towards the upper end of the post 61. Any number of locking slots 63 can be formed into the post and the preferred embodiment has the three shown slots 63.

The post also includes a positioning slot 71 extending longitudinally from a location adjacent the upper end. The positioning slot 71 extends over the locking slots 63 to the face 67 of the last locking slot 63. In another embodiment, the positioning slot 71 can extend to a point past the locking slot 63 furthest the upper end. The positioning slot 71 is formed in the post 61 such that all through the positioning slot the post 61 has a generally D-shape cross-section. The positioning slot 71 is configured on the post 61 perpendicularly to, or at an approximately 90° angle from, the lateral indents of the locking slots 63. The upper end of the positioning slot 71 forms a stop plate 73 at the upper end of the post 61. A removal slot 75 is formed into the upper end of the post 61 adjacent the stop plate 75. A channel 77 is therefore formed connecting the positioning slot 71 to the removal slot 75.

As seen in the Figures, the present invention also includes a locking plate 82 which has a generally L-shape side view. As such, the locking plate has a foot portion, which serves as a locking portion 84, and a leg portion, which serves as a positioning portion 86. Towards the end of the positioning portion 86, the locking plates 82 includes an indent. The width of the locking plate 82 is approximately the size of the locking slot 63 so that the locking plate can move through the slot 63. In an assembled configuration, the positioning portion 86 fits through the slot 24 such that the indent is on the outer side of the housing.

The present invention provides a button 90 that snaps onto the positioning portion 86. The button 90 fits over the end of the locking plate and into the indent 88 to connect to the positioning portion end of the locking plate. In the preferred embodiment, a tab (not shown) on the underside of the button fits within the indent 76 within the housing. A coil spring 92 is placed between the button 90 and the housing so that the spring surrounds the locking plate. The spring 92 is biased to urge the locking portions into the locking slots 63 or against the post in positioning slot 71.

As seen in the Figures, the post 61 has a generally cylindrical shape, the locking slots 63 have a generally rectangular shape. In an alternative embodiment (not shown), the locking slots have a semicircular shape and the locking plate has a corresponding circular cross-section portion that fits into the slots.

In an assembled version of the present invention, as seen in FIGS. 1 and 2, the post 61 is inserted into the hole 22 and the locking plate 82 is positioned in the slot 24 such that the locking portion 84 is placed on the side of the post 61 with the locking slots 63. The positioning portion 84 extends laterally through the positioning slot and through slot 24 so that the button 90 can be snap-fitted onto the end. The spring 92 fits between the housing and the underside of the button 90. The post 61 is inserted so that the locking portion 84 can fit within the locking slots 63 and the positioning portion 86 fits within the positioning slot 71. The blade 20 is connected to the blade holder 18 so that the blade extends through the hole 38 of the foot portion 32 in a conventional configuration.

Figure 6:
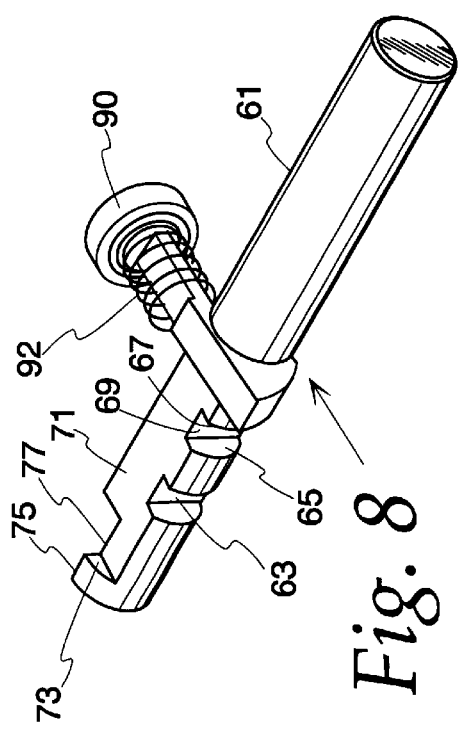
FIG. 6 shows the locking plate removed from the locking slot and in an open position to adjust the position of the guide shoe.
Figure 7:
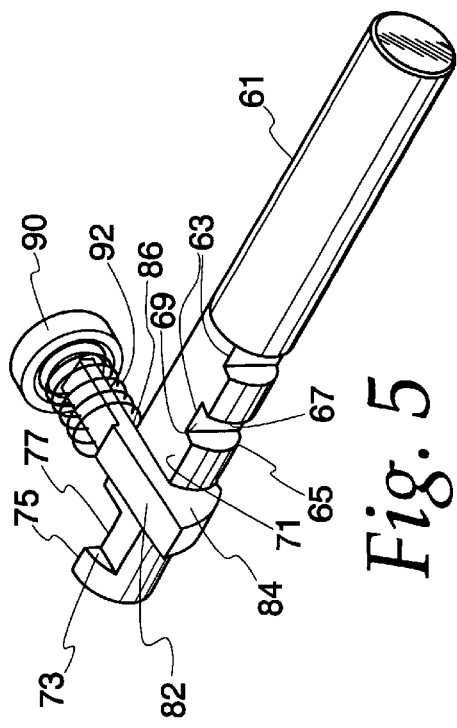
FIG. 7 shows the locking plate moved through the positioning slot to another locking slot while in the open position to adjust the position of the guide shoe.
Figure 8:
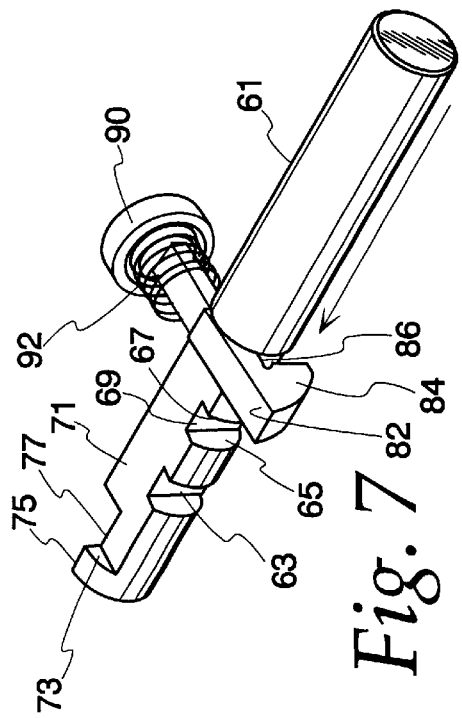
FIG. 8 shows the locking plate inserted into the other locking slot and into an engaged position after adjusting the position of the guide shoe.

The operation of the tool-less guide shoe of the present invention is shown in FIGS. 5–13. The adjustment of the guide shoe 30 between position is shown in FIGS. 5–8. FIGS. 9–13 illustrate the removal of the guide shoe 30 from the nose section 16. The spring 92 biases the locking plate 82 against the post 61. In the engaged position, as seen in FIGS. 5, 8 and 9, the locking plate 82 is biased such that the locking portion 84 is placed within the locking slots 63. As can be appreciated, the locking portion 84 is biased against the slot bottom 69 and is between the cam faces 65, 67. In order to adjust the position of the guide shoe 30, the user will push the button 90, thereby pushing the locking portion 84 into the open position. In the open position, the locking portion 84 is pushed out of the locking slots 63, as seen in FIGS. 6 and 10. Furthermore, the movement of the locking plate 82 will place the positioning portion 86 within the positioning slot 71. The post 61, and the guide shoe 30, can therefore move in and out of the hole 22, as seen in FIGS. 7 and 11, and relative the blade holder 18. The button 90 can be released so that the spring 92 biases the locking plate 82 with another locking slot 84, as seen in FIG. 8.

If the guide shoe 30 is to be removed from the housing, the user will maintain force on the button so that the positioning portion 84 will remain in the positioning slot 71. The user can move the post 61 until the locking plate comes into contact with the stop plate 73, therefore restricting the outward movement of the guide shoe, as shown in FIG. 11. In order to remove the guide shoe 30, the locking plate 82 must move into the removal slot 75. To do so, the post 61 must be rotated so that the locking plate 82 moves from the positioning slot 71 through the channel 77 into the removal slot 75, shown in FIG. 12. The post can then be removed from the hole 22 and the saw as seen in FIG. 13.

It will be appreciated that in order to move into the removal slot, the blade 20 must be removed from the blade holder 18. The elongated sides 40 will prevent the rotation of the guide shoe 30 by coming into contact with the blade 20. In the preferred embodiment, the guide shoe 30, and the post 61, must be rotated 90° so that the positioning portion will be oriented into the removal slot 75 and the guide shoe can be removed form the hole 22.

To insert the guide shoe 30 into the hole 22, the upper end of the post is inserted into the hole 22 and the button 90 is pressed. The post 61 is rotated into the position such that the positioning portion 86 is inserted into the removal slot 75. The guide shoe is then rotated approximately 90° from the removal slot 75 through the channel 77 and into the positioning slot 71. The post 61 is then moved so that the locking portion 62 is positioned within any of the locking slots 63.

Thus, it will be seen that the present invention provides a quick release adjustable shoe which is easy to operate and which does not require the use of special tools, such as a screwdriver or Allen wrench. The present invention allows for more efficient use of the saw blade and greater control over the depth of cut. As described, the present invention provides a removal means such that the guide shoe will not be inadvertently removed from the housing or while the blade is still connected to the blade holder.

Although the present invention has been described in considerable detail with reference to certain preferred versions, other versions are possible. Therefore, the spirit and scope of the appended claims should not be limited to the description of the preferred embodiment described.

What is claimed is:

1. A power saw having a housing including a nose section, the power saw comprising:
   a saw blade holder projecting from the nose section for reciprocating movement relative thereto;
   the nose section being provided with a receiving hole in a parallel spaced relationship with the blade holder;
   a guide shoe post received in the receiving hole for sliding movement therein, the post having a plurality of locking slots, a longitudinal positioning slot transverse to the locking slots, and terminating at a stop plate towards a first end of the post and a removal slot rotationally positioned relative the stop plate;
   a bracket connected to a second end of the post;
   a foot pivotally mounted to the bracket;
   a locking plate laterally movable within the nose section, the locking plate including a locking portion to be received in the locking slots for securing the post in a position, and a positioning portion engaging with the positioning slot, and
   wherein the post is removed from the nose section by positioning the positioning portion against the stop plate and rotating the post to the removal slot.

2. The power saw according to claim 1 further comprising:
   a button on an outer surface of the housing wherein the button is connected to the locking plate towards the positioning portion, and
   a spring positioned between the button and the housing to bias the locking portion of the locking plate into the locking slot.

3. The power saw according to claim 1 wherein the post rotates approximately 90° between the stop plate and the removal slot to remove the post from the nose section.

4. A tool-less guide shoe mechanism for use with a reciprocating saw, the guide shoe mechanism comprising:
   a post received in the saw having a first end and a second end, the post having a plurality of locking slots and a removal means at the first end;
   a guide shoe portion connected to the second end of the post, the shoe including a foot portion pivotally mounted relative the post;
   a locking plate received within the saw and movably engaged with the post relative the locking slots and the removal means, and
   wherein the post is secured in a position relative the saw by the locking plate being received in the locking slots and removed from the saw by rotating the post such that the locking plate is received in the removal means.

5. The tool-less guide shoe mechanism according to claim 4 wherein the post further comprising a positioning slot extending longitudinally along the post from a stop plate at the first end of the post towards the second end and over the locking slots.

6. The tool-less guide shoe mechanism according to claim 4 wherein the locking plate comprising:
   a locking portion at a first end of the locking plate for engagement within the locking slot, and
   a positioning portion extending from the locking portion to a second end wherein the positioning portion engages with the removal slot.

7. The tool-less guide shoe mechanism according to claim 6 wherein the locking plate has a generally L-shape wherein the locking portion is at a foot of the plate and the positioning portion is at a leg of the plate.

8. The tool-less guide shoe mechanism according to claim 4 further comprising:
a button connected to an end of the locking plate, and
a spring positioned between the button and the saw and over the locking plate to bias the locking plate onto the locking slots.

9. The tool-less guide shoe mechanism according to claim 4 wherein the post is rotated approximately 90° into the removal slot.

10. The tool-less guide shoe mechanism according to claim 4 wherein the post further comprising a stop plate at the first end of the post, the stop plate being adjacent the removal slot and rotationally approximately 90° from the removal slot.

11. The tool-less guide shoe mechanism according to claim 4 wherein the guide shoe portion comprising a bracket welded to the post and wherein the foot portion is pivotally mounted to the bracket.

12. The tool-less guide shoe mechanism according to claim 4 wherein the guide shoe portion comprising a bracket connected to the post and pins to pivotally mount the foot position to the bracket.

13. A saw having a housing and a blade holder held within the housing wherein the blade holder moves relative the housing, the saw comprising:
a blade removably connected to the blade;
a guide shoe, the guide shoe comprising:
a post removably received at a first end within the housing, the post having at least one locking slot between the first end and a second end, and a removal means at the first end,
a foot pivotally connected relative the second end of the post,
a locking plate wherein the locking plate fits within the locking slots to secure the guide shoe to the saw and fits within the removal means to remove the guide shoe from the saw, and
wherein the blade extends through the foot to prevent the guide shoe from being rotated in the removal means by the blade holder and the post is rotated within the removal means to remove the guide shoe from the saw when the blade is removed from the blade holder.

14. The saw according to claim 13 wherein the removal means comprises a stop at the first end of the post and a removal slot adjacent the stop plate at the first end of the post.

15. The saw according to claim 14 wherein the stop plate and the removal slot are separated by approximately 90°.

16. The saw according to claim 13 further comprising a spring biased button to move the locking plate between the locking slots and the removal means.

17. The saw according to claim 13 wherein the post further comprising a positioning slot to extend longitudinally along the post between the locking slots and the removal means.

18. The saw according to claim 13 wherein the guide shoe further comprising a bracket secured at one end to the second end of the post and the foot pivotally connected at another end of the bracket by at least one pin.

19. The saw according to claim 13 wherein the locking plate has an L-shape.

* * * * *